US009911255B2

(12) United States Patent
Lee

(10) Patent No.: US 9,911,255 B2
(45) Date of Patent: Mar. 6, 2018

(54) CAR MANAGEMENT SYSTEM AND METHOD

(71) Applicant: Hyundai Motor Company, Seoul (KR)

(72) Inventor: Hyun-woo Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/226,958

(22) Filed: Aug. 3, 2016

(65) Prior Publication Data

US 2017/0186251 A1 Jun. 29, 2017

(30) Foreign Application Priority Data

Dec. 28, 2015 (KR) ........................ 10-2015-0187094

(51) Int. Cl.
*H04Q 1/00* (2006.01)
*G07C 9/00* (2006.01)

(52) U.S. Cl.
CPC ..... *G07C 9/00007* (2013.01); *G07C 9/00103* (2013.01); *G07C 9/00309* (2013.01); *G07C 9/00571* (2013.01); *G07C 2009/00769* (2013.01); *G07C 2009/00793* (2013.01); *G07C 2009/00865* (2013.01); *G07C 2209/04* (2013.01)

(58) Field of Classification Search
CPC ... B60R 25/24; B60R 25/241; G07C 9/00126; G07C 9/00166
USPC ... 340/426.35, 426.36, 5.6, 5.61, 5.64, 5.65, 340/5.7, 5.72, 5.8
See application file for complete search history.

(56) References Cited

U.S. PATENT DOCUMENTS

| 8,768,565 B2* | 7/2014 | Jefferies | G07B 15/00 701/29.6 |
| 2006/0170533 A1* | 8/2006 | Chioiu | G07C 9/00103 340/5.61 |
| 2009/0249081 A1* | 10/2009 | Zayas | G06F 21/80 713/193 |
| 2012/0313796 A1* | 12/2012 | Lee | B60R 25/2018 340/989 |
| 2013/0099892 A1* | 4/2013 | Tucker | G07C 9/00309 340/5.61 |

(Continued)

FOREIGN PATENT DOCUMENTS

| JP | 2004-190233 A | 7/2004 |
| JP | 2012-079109 A | 4/2012 |

(Continued)

OTHER PUBLICATIONS

Korean Office Action dated Jul. 4, 2016 in corresponding KR 10-2015-0187094.

*Primary Examiner* — Carlos E Garcia
(74) *Attorney, Agent, or Firm* — Mintz Levin Cohn Ferris Glovsky and Popeo, P.C.; Peter F. Corless

(57) ABSTRACT

A car management system includes, for example, a second terminal generating first and second tokens in response to a request from a first terminal to use a vehicle, and sending the first token to the first terminal; and a third terminal authorizing the first terminal to use the vehicle by generating an access key that provides authority to use the vehicle using the first token and the second token in response to a request from the first terminal for the access key, and providing the generated access key to the first terminal.

11 Claims, 12 Drawing Sheets

(56) References Cited

U.S. PATENT DOCUMENTS

2015/0145647 A1* 5/2015 Engel-Dahan ..... G07C 9/00571
340/5.61
2015/0363986 A1* 12/2015 Hoyos ................ G07C 9/00571
340/5.61
2016/0055699 A1* 2/2016 Vincenti ............ G07C 9/00309
340/5.61

FOREIGN PATENT DOCUMENTS

| JP | 2013-037568 A | 2/2013 |
| KR | 10-2007-0010536 A | 1/2007 |
| KR | 2008-293253 A | 12/2008 |
| KR | 10-2015-0053849 | 5/2015 |
| KR | 10-2015-0063198 | 6/2015 |

* cited by examiner

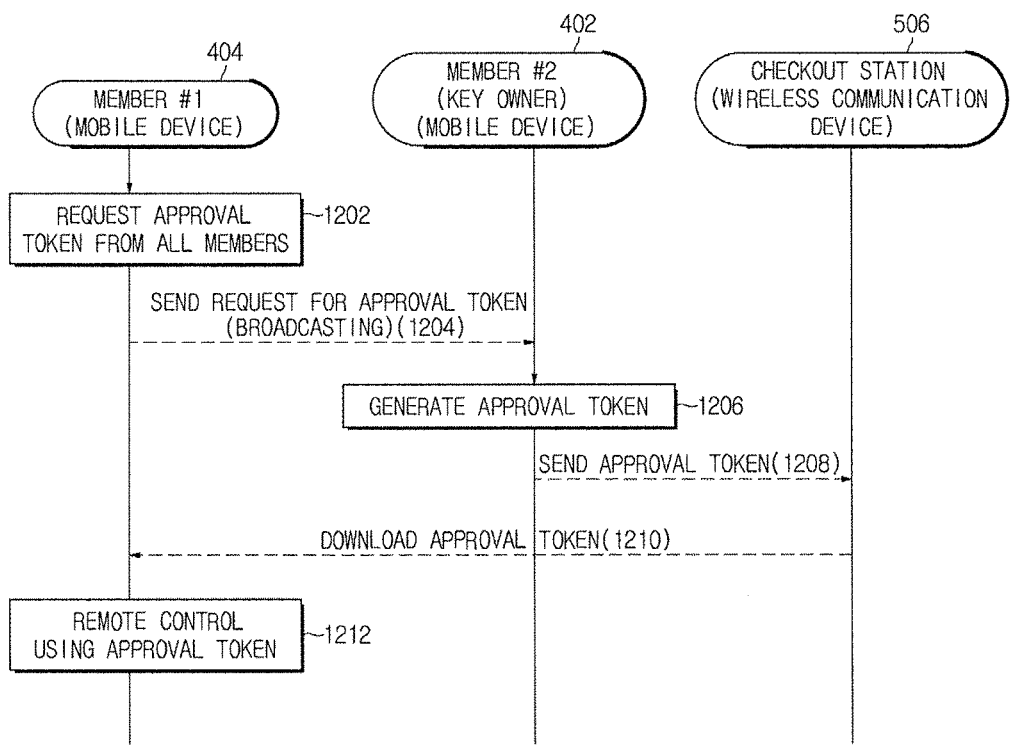

CAR MANAGEMENT SYSTEM AND METHOD

CROSS-REFERENCE TO RELATED APPLICATION(S)

This application claims priority to and the benefit of under 35 U.S.C. § 119(a) a Korean patent application filed on Dec. 28, 2015 in the Korean Intellectual Property Office and assigned Serial No. 10-2015-0187094, the entire disclosure of which is incorporated hereby incorporated by reference.

BACKGROUND

1. Technical Field

The present disclosure relates generally to vehicles, and more particularly, to a car management system and method when a vehicle is shared among multiple users.

2. Description of the Related Art

Vehicle keys can be used to lock and unlock the vehicle, start the engine of the vehicle, and so forth. Typical keys for vehicles are physical keys that can lock or unlock the doors of the vehicle by being inserted into a key hole formed next to the door handle of the door, or to start or stop the engine by being inserted into a key hole formed inside the vehicle. Additionally, the use of remote-control typed keys using short range wireless communication, referred to as "smart keys," has been on the rise recently.

There may typically be multiple keys provided to a driver when a vehicle is purchased. Since there are regulations on reproduction of the car keys, if more keys are wanted, the reproduction of the keys needs to go through a separate, complicated authentication (certification) process.

If a single vehicle, e.g., a family car, is shared among several family members, the limitation on the number of keys for the vehicle may cause an inconvenience. Additionally, in a case of a car rental business with several customers, or a case of a business car that may be used by many people in a company, management of the keys for such cars becomes very difficult.

SUMMARY

An object of the present disclosure is to conveniently issue authority for a user among multiple users to use a single vehicle in a system where the vehicle is shared among the multiple users. Another object of the present disclosure is to raise the security level in authorizing the user among multiple users to use the shared vehicle.

In accordance with embodiments of the present disclosure, a car management system includes: a second terminal generating first and second tokens in response to a request from a first terminal to use a vehicle, and sending the first token to the first terminal; and a third terminal authorizing the first terminal to use the vehicle by generating an access key that provides authority to use the vehicle using the first token and the second token in response to a request from the first terminal for the access key, and providing the generated access key to the first terminal.

The third terminal may generate the access key when a result of combining the first token and the second token under a predetermined rule meets a predetermined access key generation condition.

The first and second terminals, respectively, may be mobile devices capable of wireless communication.

The first terminal may be a mobile device of a user that uses the vehicle, and the second terminal may be a mobile device of a manager who has a right to manage the vehicle.

The third terminal may be an unmanned terminal installed in a location where the vehicle for which authority is to be issued is standing by.

The first terminal may generate and send a remote control command to the vehicle through a remote server so as to control the vehicle.

The server may be a server of a telematics center.

The server may check a validity of the access key provided to the first terminal before sending the remote control command to the vehicle.

The first terminal may generate and send a remote control command to the vehicle through short range wireless communication so as to control the vehicle.

The request from the first terminal to use the vehicle may include user information of a user that will use the vehicle, and validity of the user information may be determined when the first and second tokens are generated by the second terminal.

Furthermore, in accordance with embodiments of the present disclosure, a car management method includes: generating, by a first terminal, a request to use a vehicle; generating, by a second terminal, first and second tokens in response to the request from the first terminal to use the vehicle; sending, by the second terminal, the first token to the first terminal; authorizing, by a third terminal, the first terminal to use the vehicle by generating an access key that provides authority to use the vehicle when a result of combining the first token and the second token under a predetermined rule meets a predetermined access key generation condition, in response to a request from the first terminal for the access key; and providing, by the third terminal, the generated access key to the first terminal.

Furthermore, in accordance with embodiments of the present disclosure, another car management method includes: generating, by a first terminal, a request to use a vehicle; generating, by a second terminal, an approval token in response to the request from the first terminal to use the vehicle; receiving, by a third terminal, the approval token from the second terminal; storing, by the third terminal, the approval token; and providing, by the third terminal, providing the approval token to the first terminal in response to a request from the first terminal to download the approval token, thus authorizing the first terminal to use the vehicle.

Furthermore, in accordance with embodiments of the present disclosure, another car management system includes: a second terminal generating a second token and belonging to a manager who has a right to manage a vehicle; and a third terminal generating an access key that provides authority to use the vehicle using a first token generated by a first terminal of a user and the second token generated by the second terminal, and authorizing the first terminal to use the vehicle by providing the generated access key to the first terminal. The third terminal is installed in a location where the vehicle for which authority is to be issued is standing by, in the form of an unmanned terminal.

Furthermore, in accordance with embodiments of the present disclosure, another car management system includes: a third terminal generating an access key that provides authority to use a vehicle using a first token generated by a first terminal of a first user and a second token generated by a second terminal of a second user, and authorizing the first terminal to use the vehicle by providing the generated access key to the first terminal. The third terminal is installed in a location shared by the first user of the first terminal and the second user of the second terminal, in the form of an Internet of Things (IoT) device.

Other aspects, advantages, and salient features of the disclosure will become apparent to those skilled in the art from the following detailed description, which, taken in conjunction with the annexed drawings, discloses embodiments of the disclosure.

BRIEF DESCRIPTION OF THE DRAWINGS

The above and other features and advantages of the present disclosure will become more apparent by describing in detail embodiments thereof with reference to the attached drawings in which:

FIG. 12 is a flowchart illustrating a car management method, according to another embodiment of the present disclosure.

Throughout the drawings, like reference numerals will be understood to refer to like parts, components, and structures.

DETAILED DESCRIPTION OF THE EMBODIMENTS

Figure 1:
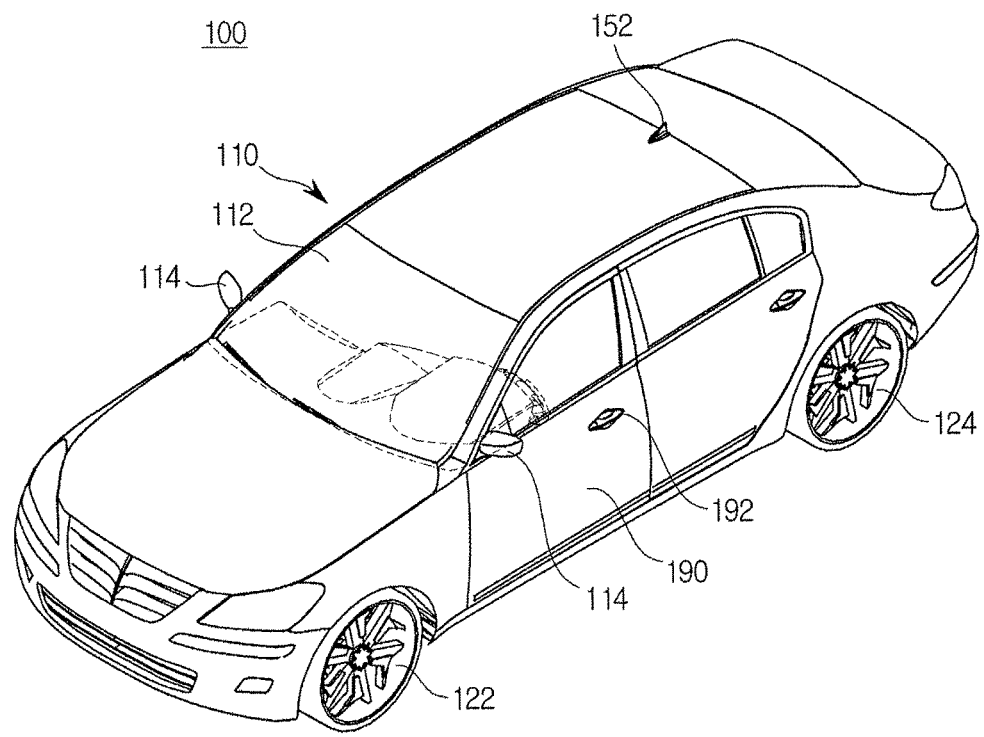
FIG. 1 shows a vehicle, according to an embodiment of the present disclosure.

The present disclosure will now be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. Like reference numerals in the drawings denote like elements, and thus their description will be omitted. In the description of the present disclosure, if it is determined that a detailed description of commonly-used technologies or structures related to the embodiments of the present disclosure may unnecessarily obscure the subject matter of the invention, the detailed description will be omitted. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or "car" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one terminal including a memory and a processor. The memory is configured to store program instructions, and the processor is specifically programmed to execute the program instructions to perform one or more processes which are described further below. Moreover, it is understood that the term "controller," as used herein, may refer to a hardware device that includes a memory and a processor.

Referring now to the disclosed embodiments, FIG. 1 shows a vehicle, according to an embodiment of the present disclosure. As shown in FIG. 1, the vehicle 100 may include a main frame that constitutes the exterior of the vehicle 100, a windshield 112 for providing the driver and passenger with a view ahead of the vehicle 100 while protecting them from wind, outside mirrors 114 for helping the driver see views behind and to the sides of the vehicle 100, doors 190 for shielding the interior of the vehicle 100 from the outside, front wheels 122 located in the front part of the vehicle 100, and rear wheels 124 located in the rear part of the vehicle 100.

The windshield 112 is mounted on the upper front of the vehicle 100 for securing a view ahead of the vehicle 100 for the driver and passenger in the vehicle 100. The outside mirrors 114 may be mounted on the left and right doors 190, one on each door. The driver of the vehicle 100 may obtain views to the sides and to the rear sides of the vehicle 100 through the outside mirrors 114.

The doors 190 may be pivotally attached onto the left and right sides of the main frame 110, and opened for the driver and passenger to get on or off the vehicle 100 and closed for shielding the inside of the vehicle 100 from outside. The doors 190 may be locked or unlocked using a door locking device 192. Locking or unlocking by the door locking device 192 may be done in a method for the user to approach the vehicle 100 to directly manipulate a button or lever of the door locking device 192, or in a method for the user located at a distance from the vehicle 100 to lock or unlock the vehicle 100 remotely with a remote controller.

An antenna 152 is for receiving broadcasting/communication signals of telematics, Digital Multimedia Broadcasting (DMB), digital TV, Global Positioning System (GPS), etc., and may be a multifunctional antenna for receiving various kinds of broadcasting/communication signals or a uni-functional antenna for receiving one type of broadcasting/communication signals. Though a particular external vehicular appearance is shown in FIG. 1, the scope of the present disclosure is not limited thereto. Rather, the external configuration of vehicle 100 illustrated in FIG. 1 and described hereinabove is merely provided for demonstration purposes and should not be treated as limiting.

Figure 2:
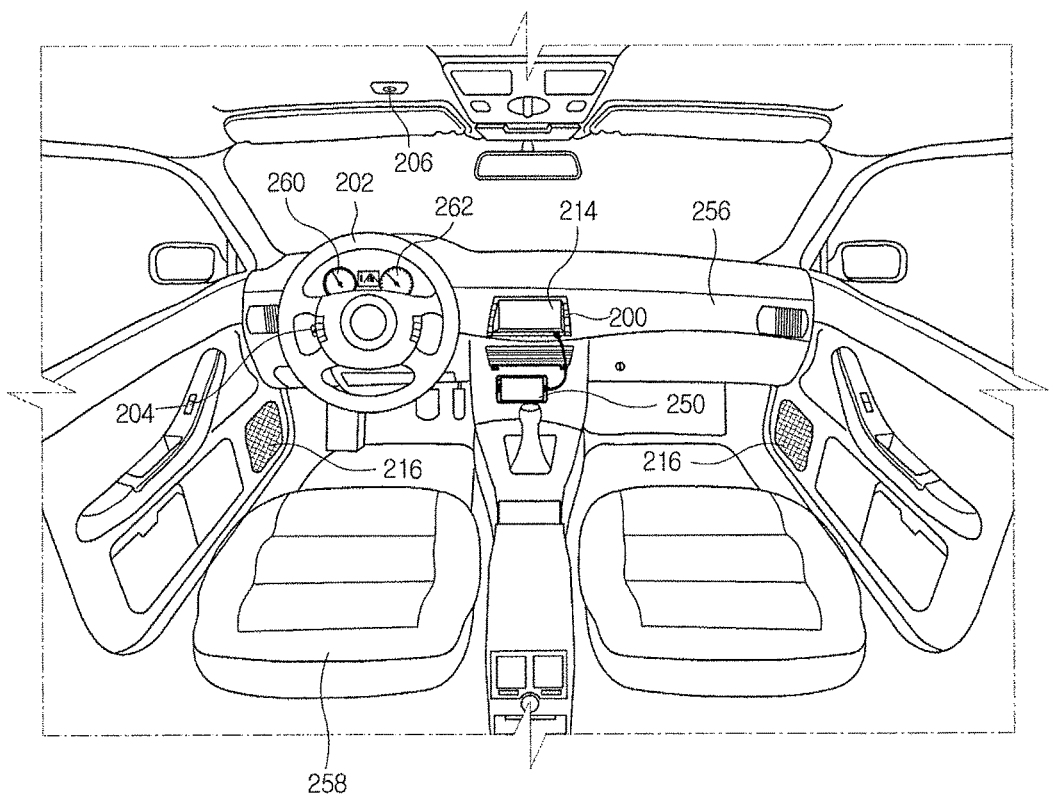
FIG. 2 shows the interior of the vehicle of FIG. 1.

FIG. 2 shows the interior of the vehicle of FIG. 1. As shown in FIG. 2, the interior of the vehicle 100 may include a dashboard 256 equipped with various devices for the driver to control the vehicle 100, a driver seat 258 for the driver to take a seat, cluster indicators 260 and 262 for indicating operation information of the vehicle 100, and an Audio Video and Navigation (AVN) device 200, a multimedia device for performing various multimedia functions at a control command of the person in the vehicle 100. The AVN device 200 may perform audio and video functions as well as a navigation function for route guidance.

The dashboard 256 may be formed to protrude toward the driver from the bottom of the windshield 112, allowing the driver to manipulate the various devices installed on the dashboard 256 while looking forward.

The driver seat 258 is located opposite the dashboard 256, allowing the driver to drive the vehicle 100 while keeping his/her eye on the road ahead of the vehicle 100 and various devices on the dashboard in a comfortable position.

The cluster indicators 260, 262 may be installed on the dashboard 256 to face the driver seat 258, and may include a speed gage 260 for indicating the current speed of the vehicle 100 and an rpm gage 262 for indicating revolutions per minute of a power system (not shown).

The AVN device 200 may include a display 214 for displaying information about a road the vehicle 100 is traveling or a route to a destination intended by the driver, and a speaker 216 for producing sound at the control command of the driver.

Furthermore, the AVN device 200 is capable of performing short range wireless communication, enabling exchanges of information with the external device 250 through the short range wireless communication. For this, the external device 250 is also required to be capable of performing short range wireless communication with the AVN device 200. In addition, the AVN device 200 may be connected to the external device 250 in a wired manner, such as via a Universal Serial Bus (USB) cable.

The AVN device 200 may be based on voice recognition control. For this, a voice recognition button 204 may be equipped in the steering wheel 202, and a microphone 206 is equipped on the upper part of the driver seat 258. The voice recognition button 204, the microphone 206, the speaker 216, etc., may be used as auxiliary tools for voice recognition control of the AVN device 200.

FIG. 2 shows the external device 250 connected to the AVN device 200 for mutual communication. The external device 250 that may be connected to the AVN device 200 for communication may include not only a mobile device, such as a smart phone or tablet, but also an external storage device, such as an external Hard Disk Drive (HDD), an external Solid State Device (SSD), and a USB memory. Furthermore, even an Internet of Things (IoT) device or a streaming service provider may be connected to the AVN device 200 as the external device 250. The AVN device 200 may receive multimedia contents from the external device 250 and present them on the display 214 of the AVN device 200. Though a particular internal vehicular appearance is shown in FIG. 2, the scope of the present disclosure is not limited thereto. Rather, the internal configuration of vehicle 100 illustrated in FIG. 2 and described hereinabove is merely provided for demonstration purposes and should not be treated as limiting.

Figure 3:
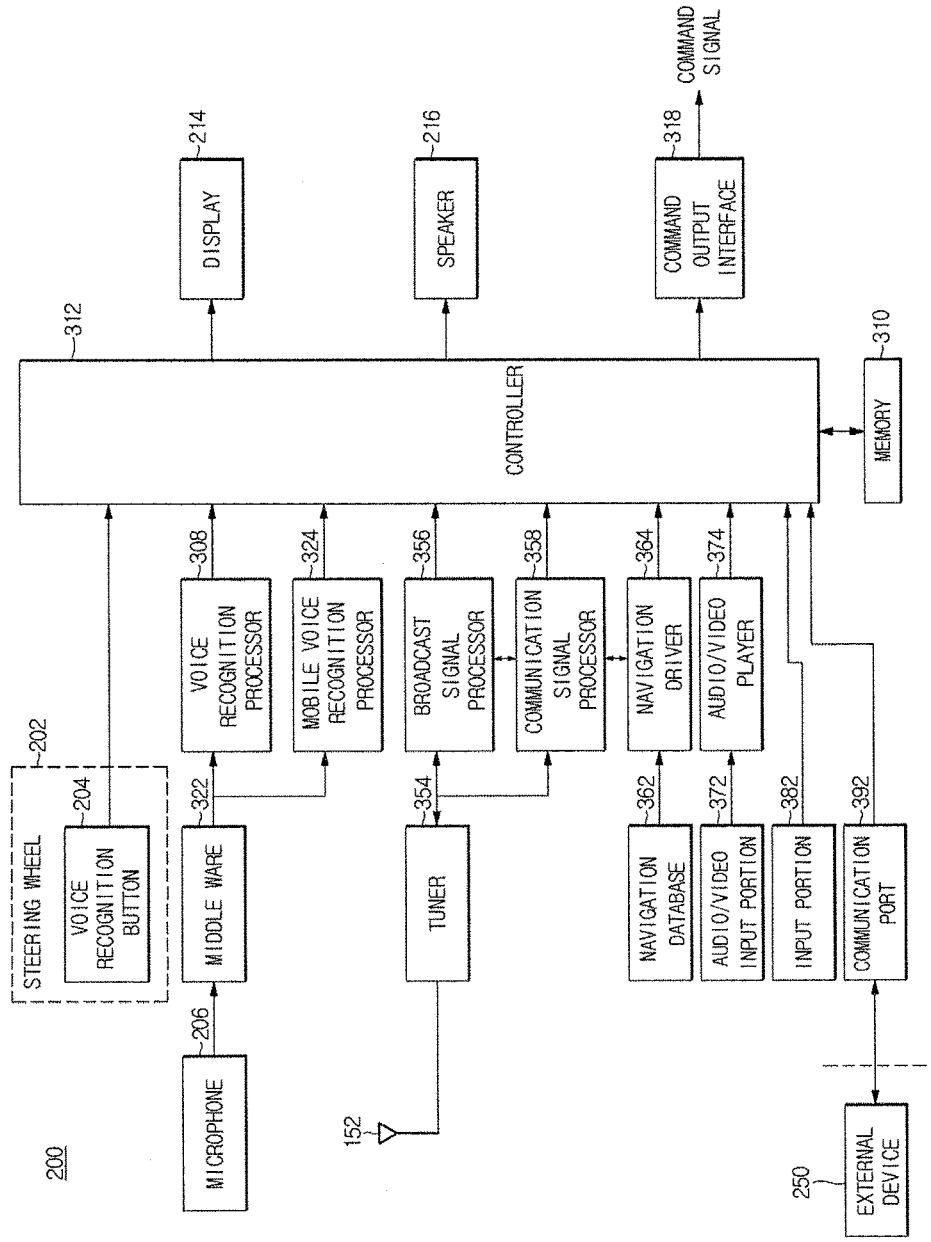
FIG. 3 is a block diagram of an Audio Video and Navigation (AVN) of a vehicle, according to an embodiment of the present disclosure.

FIG. 3 is a block diagram of an AVN device of a vehicle, according to an embodiment of the present disclosure. As shown in FIG. 3, features of the AVN device 200 may be classified largely into elements for voice recognition function, elements for general input function, elements for broadcasting/communication function, elements for navigation function, elements for audio/video function, and elements that may be commonly used for the plurality of functions.

The elements for voice recognition function may include a voice recognition button 204, a microphone 206, a middleware 322, a voice recognition processor 308, and a command output interface 318. Although not an element belonging to the AVN device 200, a mobile voice recognition processor 324 included in a remote server may be communicatively connected to the middleware 322 and controller 312 via the mobile device 250 as an external device. The elements for broadcasting/communication function may include an antenna 152, tuner 354, a broadcast signal processor 356, and a communication signal processor 358. The elements for navigation function may include a navigation database 362 and a navigation driver 364. The elements for audio/video function may include an audio/video input unit 372 and an audio/video player 374. The elements for general input function may include an input unit 382. The elements that may be commonly used for the plurality of functions may include a memory 310, a controller 312, a display 214, and a speaker 216. Such functional classification is not limited thereto, and it is also possible that an element used for a function may also be used for another function.

The voice recognition button 204 may allow the driver or passenger to execute and use complex functions, such as the audio function, video function, navigation function, information and communication function, etc., of the AVN device 200. For this, the voice recognition button 204 may support one-key manipulation in a Push-To-Talk (PTT) method. The voice recognition button 204 may be installed on the steering wheel 202 for easy manipulation of the driver even while the driver is driving the vehicle 100. The steering wheel 202 is a steering device used to change moving directions of the vehicle 100 by moving the wheels of the vehicle 100 to the left and right. Since the driver always holds the steering wheel 202 while driving, the voice recognition button 204 installed on the steering wheel 202 may allow the driver to conveniently manipulate the voice recognition button 204 while driving. The voice recognition button 204 may be installed anywhere in the vehicle 100 other than the steering wheel 202 if the position allows the driver to easily manipulate the voice recognition button 204.

The microphone 206 may receive a voice signal pronounced by the driver and convert the voice signal to an electric signal while a voice recognition control function is activated. The microphone 206 may be one dedicated to voice recognition control, or one shared for hands-free. Alternatively, the microphone 206 may be a microphone of a mobile device 250 carried by the driver. In the case of using the microphone of the mobile device 250, the mobile device 250 and the AVN device 200 are required to be connected to each other for short range communication, such as Bluetooth.

The voice recognition processor 308 of the AVN device 200 may perform voice recognition on an electric signal obtained by converting an electric signal converted by the microphone 206 and received through the middleware 322, and extract text data as voice command information as a result of the voice recognition. The text data extracted by the voice recognition processor 308 may be delivered to the middleware 322 before being delivered to the controller 312.

The middleware 322 is a relaying means for determining whether the text data received from the voice recognition processor 308 of the AVN device 200 is a reserved word for voice recognition control of the AVN device 200 or for voice recognition control of the mobile device 250. If the text data is a reserved word for voice recognition control of the AVN device 200, the middleware 322 may send the text data to the controller 312 for voice recognition control for the AVN device 200. Otherwise, if the text data is not a reserved word for voice recognition control of the AVN device 200, the middleware 322 may send the text data to the mobile device 250 for voice recognition control for the mobile device 250. In other words, the middleware 322 may automatically relay a voice signal pronounced by the driver or passenger by determining whether the voice signal is a reserved word for voice recognition control of the AVN device 200 or of the mobile device 250. In this process, no intervention is needed by the driver or passenger in identifying whether the voice signal is a reserved word for voice recognition control of the AVN device 200 or the mobile device 250.

The command output interface 318 may deliver a signal of a control command corresponding to the voice command information extracted as a result of voice recognition to a target device to be controlled from the controller 312.

The antenna 152 is a device for receiving or transmitting radio waves in the air for the purpose of receiving broadcast signals or transmitting/receiving communication signals.

The antenna 152 may be communicatively connected to the tuner 354. Accordingly, the radio waves received by the antenna 152 may be delivered to the tuner 354. The antenna 152 may be implemented in the form of multiple antennas for transmitting or receiving many different types of broadcast/communication signals. In an embodiment of the present disclosure, the antenna 152 receives DMB signals, or transmits/receives telematics signals in the 3G/Long Term Evolution (LTE).

The tuner 354 may convert the radio waves received by the antenna 152 to e.g., intermediate frequency signals. The tuner 354 may also convert a data signal for transmission into a form that may be propagated in the air through the antenna 152. In other words, the tuner 354 may extract signals in a particular band, or perform a task, e.g., of carrying the data signal onto the carrier waves. The tuner 354 may receive broadcast signals or transmit/receive communication signals. The broadcast signals may include radio broadcast signals and DMB broadcast signals. The communication signals may include signals from communication with Global Positioning System (GPS) satellites. The communication signals may also include communication signals for telematics. Which signal is to be received and processed by the tuner 354 may be determined according to a control signal sent to the tuner 354 from the controller 312. For example, when the controller 312 generates and sends a control signal to receive a radio broadcast signal at a particular channel to the tuner 354, the tuner 354 may receive the radio broadcast signal at the channel in response to the control signal sent from the controller 312. If the controller 312 sends the control signal and transmission data for transmission of the telematics signals to the tuner 354, the tuner 354 may convert the transmission data into a form to be transmitted in the air in response to the control signal sent from the controller 312 and transmit the converted signal into the air through the antenna 352. The tuner 354 may also obtain information about a broadcast channel included in the broadcast signal. The broadcast signal received by the tuner 354 may include the name of the broadcast channel, service IDentification (ID), and broadcast data. The tuner 354 may extract and send the name of the broadcast channel, service ID, and broadcast data from the broadcast signal to the broadcast signal processor 356 and the controller 312.

The broadcast signal processor 356 may divide the broadcast signals via the tuner 354 into video broadcast signals and audio broadcast signals and perform a series of signal processing on them. The series of signal processing performed by the broadcast signal processor 356 may include analog-to-digital conversion, digital-to-analog conversion, conversion of video data into a form to drive the display 214, etc.

The communication signal processor 358 may process the communication signals with the GPS satellite and telematics communication signals. Specifically, the communication signal processor 358 may convert the received communication signal into a data form to be sent to the controller 312, or convert data received from the controller 312 for transmission via the tuner 354 and antenna 152 to a signal in the form available for communication.

The navigation database 362 may include data to implement navigation. The navigation database 362 may have the form of a memory card or Digital Versatile Disc (DVD). Alternatively, navigation data provided from the mobile device 250 connected by a wired/wireless link, e.g., CarPlay or Android Auto may be used as the navigation database.

The navigation driver 364 may make up a navigation screen on the display 214 using the data provided from the navigation database 362. For this, it may receive information about navigation settings, such as a destination and stopovers set by the driver, a pattern of a route, etc., from the controller 312. Furthermore, the navigation driver 364 may receive information about a current location of the vehicle 100 obtained through communication with the GPS satellite from the controller 312 to implement navigation.

The audio/video input unit 372 may be an optical disc drive. Alternatively, the audio/video input unit 372 may be a USB input/output device or a preliminary input/output terminal, alias AUX. Alternatively, the audio/video input unit 372 may be a bluetooth device for wireless connection to a mobile device 250. The mobile device 250 connected to the audio/video input unit 372 through bluetooth may be a mobile phone or a portable digital sound reproducing device.

The audio/video player 374 may process audio/video data input through the audio/video input unit 372 to be output through the speaker 216 or display 214. For example, if the audio/video input unit 372 is an optical disc drive, the optical disc drive may read out audio/video data recorded on an optical disc, e.g., Compact Disc (CD), DVD, Blueray Disc (BD), etc., and the audio/video player 374 may convert the audio/video data read out by the audio/video input unit 372 to a signal in the form to drive the speaker 216 or the display 214 and send the signal to the speaker 216 or the display 214 to reproduce the audio/video. Even for audio/video data provided from a medium other than the optical disc, the audio/video data may be converted into a form to drive the speaker 216 or the display 214 while going through the audio/video player 374.

The input unit 382 may be at least one button arranged in the AVN device 200, or a touch screen implemented on the display 214. The driver or passenger may select one of the complex functions of the AVN device 200 by manipulation of the input unit 382, and apply various settings for an expected task to be performed from the selected function. The voice recognition button 204 of the steering wheel 202 may also be included in the at least one button that makes up the input unit 382.

The communication port 392 may include e.g., a USB port or a firewire port. Inserting a communication cable into the communication port 392 may enable communication between the AVN device 200 and the external device 250 connected to the AVN device 200 via a cable. Furthermore, the communication port 392 may be used for short range wireless communication, such as Bluetooth, Wi-Fi, Zigbee, Near Field Communication (NFC), etc. The communication port 392 for short range communication may receive a remote control signal transmitted from a mobile device e.g., a smart phone, a tablet, etc., and then forward the control signal to the controller 312 or other Electronic Control Unit (ECU) of the AVN device 200. The remote control signal may be one for locking/unlocking the doors 190 of the vehicle 100 or one for starting/stopping the engine of the vehicle 100.

The controller 312 may be engaged in the overall operation of the AVN device 200 to perform required control. For example, the controller 312 may run an application in the memory 310 relating to a voice recognition function in response to a manipulation of the voice recognition button 204 to display an initial entry screen and output a related voice guidance message. The controller 312 may also receive voice command information provided from the voice recognition processor 308, and generate a control command corresponding to the voice command information to perform control corresponding to the voice command information. The controller 312 may also process broadcast/communication signals. If audio/video data generated after processing of the broadcast/communication signals is to be output to the speaker 216 or the display 214, the controller 312 may control the audio/video data to be sent to the speaker 216 or the display 214, thereby outputting required audio/video data through the speaker 216 or the display 214. Furthermore, if the driver or passenger selects the navigation function, the controller 312 may control the navigation database 362, the navigation driver 364, the display 214, and the speaker 216 to implement navigation. Moreover, the controller 312 may control audio/video data input through the audio/video input unit 372 to be played by the audio/video player 374 and sent to the speaker 216 or the display 214, thereby outputting required audio/video data through the speaker 216 or the display 214. In addition, the controller 312 may convert the name of a broadcast channel extracted by the tuner 354 from the broadcast signal to text, and send the text to the voice recognition processor 308.

The memory 310 may store various applications that may run to perform the voice recognition function, broadcasting/communication function, navigation function, and audio/video function of the AVN device 200, and screen display data, voice data, sound effect data, etc., required to run the applications.

The display 214 may output videos involved in performing the complex functions of the AVN device 200, such as the voice recognition function, broadcasting/communication function, navigation function, and audio/video function. For example, guidance screens or messages, video materials, etc., for the respective functions may be output through the display 214. Furthermore, the display 214 may display a user interface for the driver or passenger to manipulate the plurality of functions of the AVN device 200. For example, in order to perform the navigation function and broadcasting (radio/DMB) function of the AVN device 200, air conditioning function, and plus, audio function, the user interface required for user manipulation may be displayed on the display 214. However, presentation of video contents through the display 214 may be limited for the driver not to be distracted while driving the vehicle 100.

The speaker 216 may output sounds involved in performing the complex functions of the AVN device 200, such as the voice recognition function, broadcasting/communication function, navigation function, and audio/video function. For example, guidance messages, sound effects, audio materials, etc., for the respective functions may be output through the speaker 216.

Figure 4:
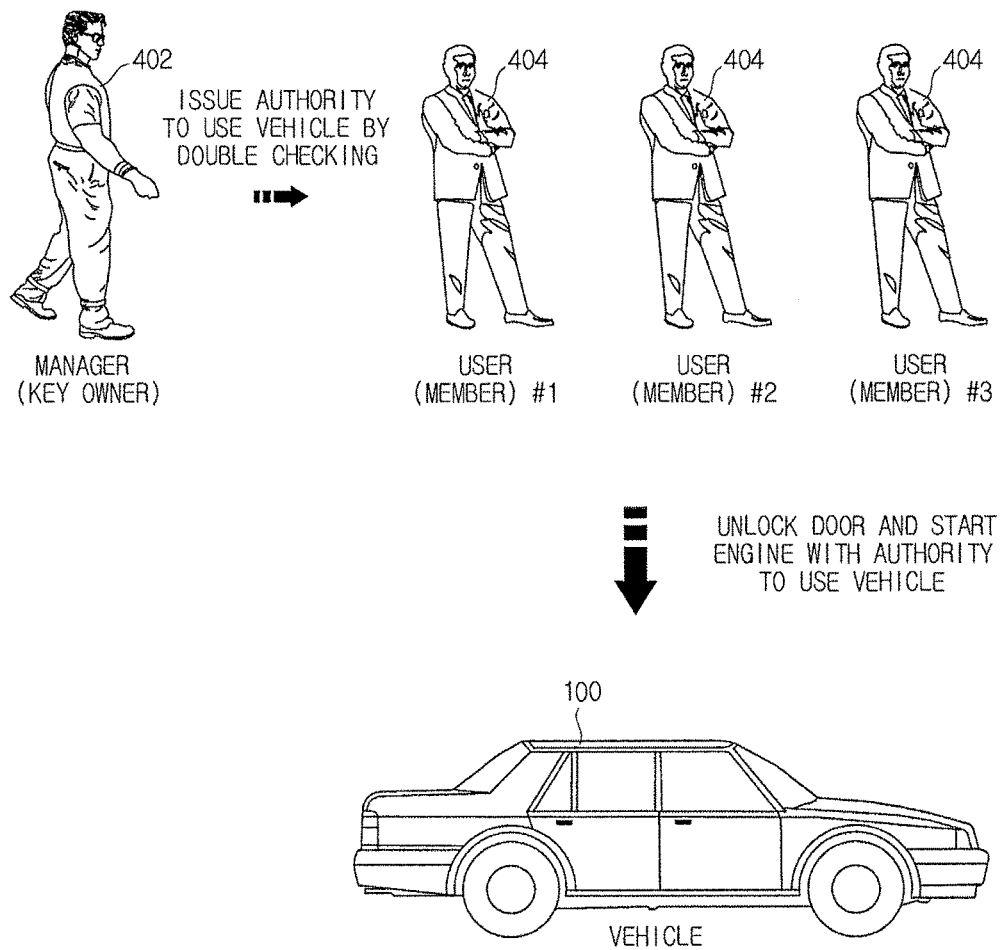
FIG. 4 shows a concept of car management for multiple users, according to an embodiment of the present disclosure.

FIG. 4 shows a concept of car management for multiple users, according to an embodiment of the present disclosure. As shown in FIG. 4, in an embodiment of the present disclosure, a manager 402 increases the security level by double checking authority of multiple users (or members) 404 to use the vehicle 100 and then limitedly issues the authority to the users 404.

The manager 402 may be an owner of the vehicle 100 or a person who has a right to authorize someone to use the vehicle 100. For example, the manager 402 may be a person in charge of managing cars in a car rental or car sharing company. Alternatively, the manager 402 may be a person responsible for management of business cars in a company. The manager 402 may also be a person who owns the car key among the family members.

The user (or member) 404 refers to a person who is authorized by the manager 402 to use the vehicle 100. For example, the user 402 may be a customer of a car rental company. The user 402 may be a staff (or member) of a company as well. The user 402 may also be one of family members.

The vehicle 100 may be a rental car of a car rental or car sharing company. Alternatively, the vehicle 100 may be a business car to be shared among many employees in a company. The vehicle 100 may be a car to be shared among family members in a house.

The embodiment of the present disclosure may be expected to have the following advantages. The manager 402 may authorize the user (or member) 404 online through device-to-device (D2D) data communication without giving a tangible key to the user 404 in person. For this, the vehicle 100 may be equipped with a communication module for remote control to lock/unlock the doors 192 and start the engine of the vehicle 100 by data communication through a terminal carried by the user 404. Since there is no need for the user 404 to receive a tangible key from the manager 402 in person, nor a need to go to return the key, the user 404 may be easily authorized to use the vehicle 100 and may conveniently return the vehicle 100.

Other advantages may also be expected from the embodiments of the present disclosure. The user 404 may be finally authorized to use the vehicle 100 by the manager 402 double checking authority sent through a direct path to the user 404 and another authority sent through a different detour. While being authorized via only one of the direct path and the detour may makes it vulnerable to hacking attempts or error occurrence, being authorized to use the vehicle 100 by double checking authority from both the direct path and the detour as in the embodiments of the present disclosure may make it possible to issue the authority to the user 404 at a more robust level of security.

<First Embodiment>

Figure 5:
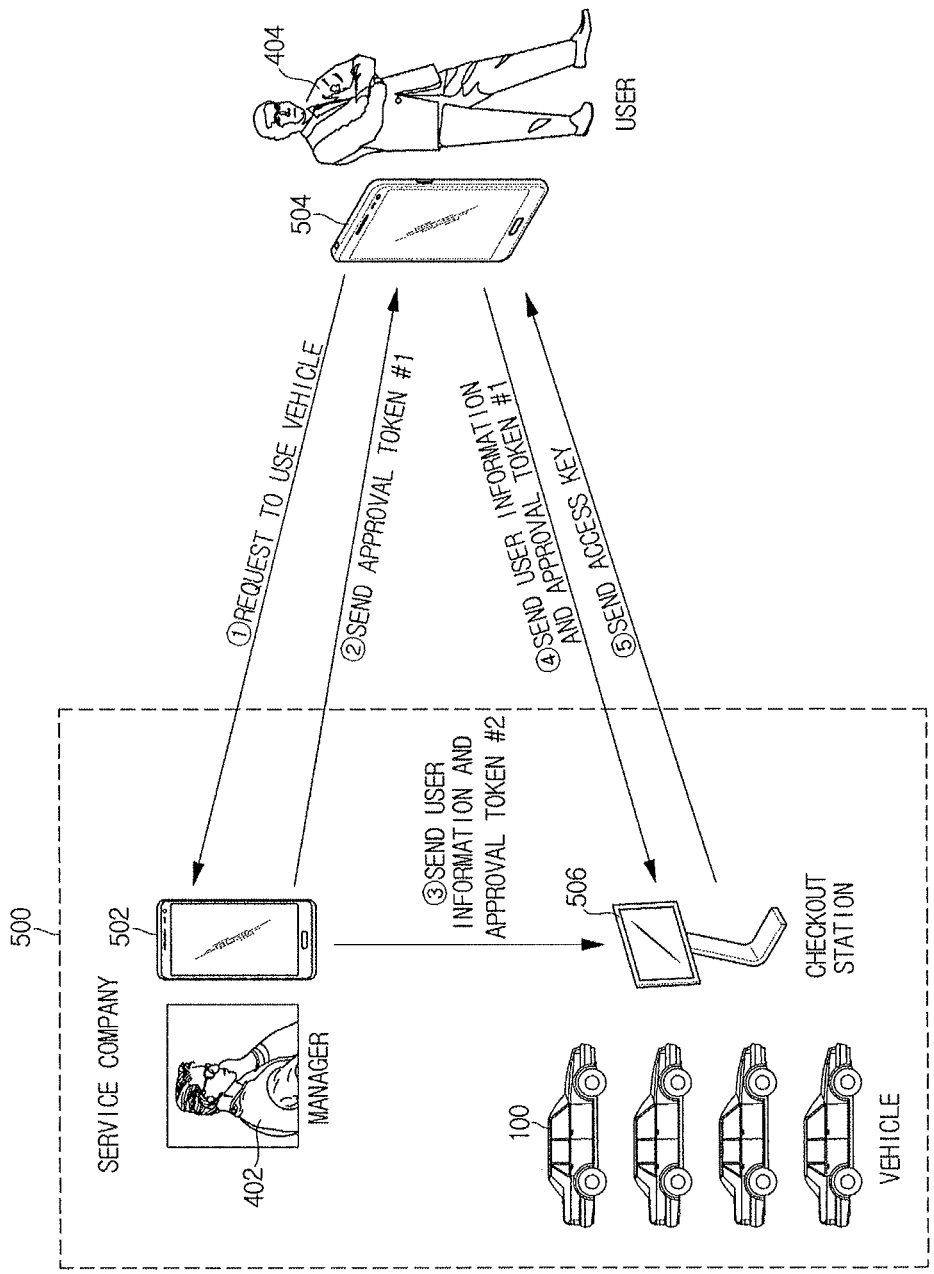
FIG. 5 shows a car management system, according to an embodiment of the present disclosure.
Figure 6:
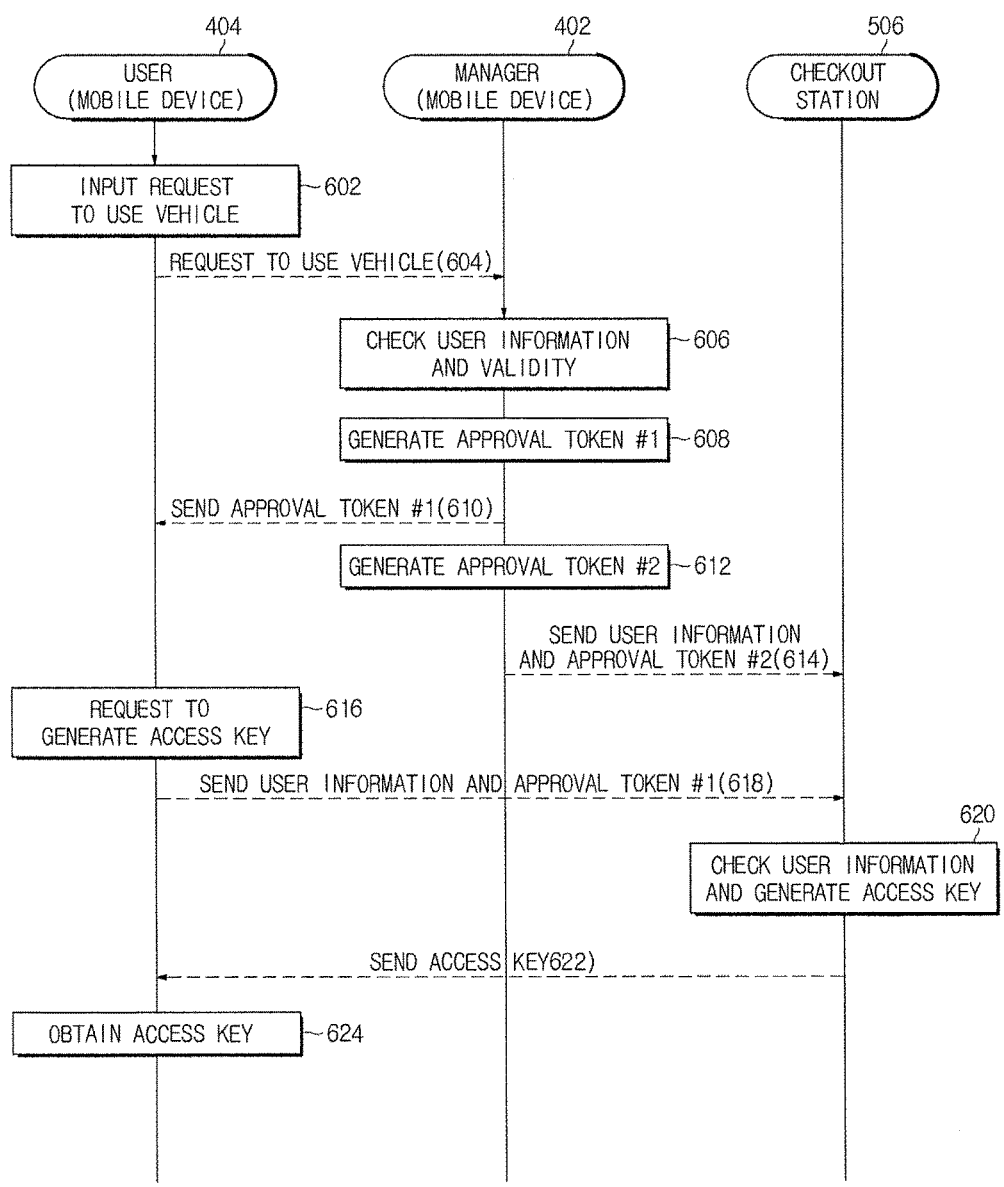
FIG. 6 is a flowchart illustrating a car management method, according to an embodiment of the present disclosure.

FIGS. 5 and 6 show a car management method, according to a first embodiment of the present disclosure. FIG. 5 shows a car management system, according to the first embodiment of the present disclosure, and FIG. 6 is a flowchart illustrating a car management method, according to the first embodiment of the present disclosure. The first embodiment shown in FIGS. 5 and 6 represents a process in which the user 404 requests the manager 402 to allow the user 404 to use the vehicle 100, and obtains authority to use the vehicle 100 from the manager 402.

Referring first to FIG. 5, in a car management system in accordance with the first embodiment of the present disclosure, wireless communication is performed between the manager 402 of a service company 500 and the user 404.

The service company 500 may be a car rental company having rental cars, a company having business cars, or a car sharing company that provides a car sharing service.

The service company 500 may have a checkout station 506. The checkout station 506 is a device to reinforce the security level with a first approval from the manager and a second approval from the checkout station 506 in the process of the user 404 gaining approval to use the vehicle 100. After gaining the first approval from the manager 402 and then the second approval from the checkout station 506 to use the vehicle 100, the user 404 may be finally authorized to use the vehicle 100. The checkout station 506 may be installed in a parking space in which the vehicle 100 is parked. As such, it is convenient for the user 404 to gain the second approval and pick up the vehicle 100 at the same location.

Wireless communication between the manager 402 and the user 404 is performed by mobile devices 502 and 504, e.g., smart phones. A manager application may be installed in the mobile device 502 (e.g., second terminal) of the manager 402. The manager application may be used to receive a request of the user 404 to use the vehicle 100, generate and send approval token #1 to the user 404 in response to the request, and help double checking made by sending user information and approval token #2 to the checkout station 506 (e.g., a third terminal). A user application may be installed in the mobile device 504 (e.g., first terminal) of the user 404. There may be a service for the user application to be freely downloaded from e.g., an open website to provide applications. The user application may be used to send the request to use the vehicle 100 and user information to the manager 402 and receive the approval token #1 from the manager 402. The user application may also be used to provide the user information and the approval token #1 to the checkout station 506 to authenticate the user 404, and obtain an access key from the checkout station 506 once the authentication of the user 404 is completed. The access key is a series of coded information created in software unlike a physical key for the vehicle 100, and the user 404 may be finally authorized to use the vehicle 100 after obtaining the access key through the mobile device 504. With the access key, locking/unlocking the doors 190 and starting/stopping the engine of the vehicle 100 may be controlled via remote control.

Communications between the manager 402 and the user 404 may be performed not only by the mobile devices 502 and 504 but also by a server (not shown) of the service company 500 and a computer (not shown), e.g., desktop, laptop, tablet, etc., of the user 404. For example, once the user 404 accesses a website of the service company 500 through his/her desktop, laptop, or tablet and inputs information required to be authorized to use the vehicle 100, the information may be sent to the server of the service company 500 and then delivered to the manager 402. Alternatively, communications between the computer of the user 404 and the mobile device 502 of the manager 402 is also possible.

A series of processes for the user 404 to request authority to use the vehicle 100 and obtain the authority will now be described in connection with FIG. 6.

The user 404 requests authority to use the vehicle 100 from the manager 402 of the service company 500 in order to use the vehicle 100 of the service company 500. For this, the user 404 inputs a car authority request through an application of the mobile device 504, in operation 602. The car authority request may include user information, e.g., name, birth date, phone number, driving license, desired car type, desired period of car use, etc.

Once the car authority request of the user 404 is input through the mobile device 504, the car authority request is sent to the mobile device 502 of the manager 402 from the mobile device 504 of the user 404 (see (1) of FIG. 5).

Upon reception of the car authority request from the user 404, the manager 404 checks contents and validity of the user information included in the car authority request, in operation 606. The validity of the user information may be determined by checking the real name and whether the user 404 is under age or not based on the name, birth date, phone number, etc. Checking the contents and validity of the user information is to determine whether the user 404 is qualified to use the vehicle 100, and detailed contents to be checked may be changed as necessary.

Once the contents and validity of the user information are checked, the manager 402 generates the approval token #1 through the mobile device 502, in operation 608. The approval token #1 generated by the mobile device 502 of the manager 402 is sent to the mobile device 504 of the user 404 (see (2) of FIG. 5).

Furthermore, the manager 402 generates the approval token #2 through the mobile device 504, in operation 612, and sends the approval token #2 to the checkout station 506 with the user information, in operation 614 (see (3) of FIG. 5). How to use the user information and approval token #2 in the checkout station 506 will be described in the following operation 620 in more detail.

Upon reception of the approval token #1 from the manager 402, the user 404 goes to the checkout station 506 installed at a location where the vehicle 100 is standing by and requests generation of an access key through the mobile device 504 of the user 404, in operation 616. Upon request of the user 404 for the access key, the user information and the approval token #1 are sent to the checkout station 506 from the mobile device 504 of the user 404, in operation 618 (see (4) of FIG. 5).

As described above, in operation 614, the manager 402 sends the user information and the approval token #2 to the checkout station 506, and in operation 618, the user 404 sends the user information and the approval token #1 to the checkout station 506. The operations 614 and 618 are to increase the security level by enabling the checkout station 506 to double check whether the user 404 has requested to use the vehicle. Specifically, the checkout station 506 checks whether the user information sent from the manager 402 matches the user information sent from the user 404 in operation 620 in order to prevent occurrence of abnormal car authority request from hacking into communication on the side of the manager 402 or hacking into communication on the side of the user 404. If the user information sent from the manager 402 matches the user information sent from the user 404, the checkout station 506 generates an access key by combining the approval token #2 sent from the manager 402 and the approval token #1 sent from the user 404, in operation 620. The approval tokens #1 and #2 may be generated to have different values by modifying the user information under a predetermined secret rule. With the approval tokens #1 and #2 combined under another predetermined secret rule, an access key having a unique value issued only to the user 404 may be generated. Generation of the approval tokens #1 and #2 based on the user information under a predetermined secret rule may guarantee primary security, and the use of another predetermined secret rule to combine the approval tokens #1 and #2 may guarantee secondary security. The two-stage security may help increase the security level of the access key.

The access key generated through the double security is sent to the mobile device 504 of the user 404 from the checkout station 506 (see (5) of FIG. 5). The mobile device 504 of the user 404 obtains the access key by receiving the access key from the checkout station 506, and thus be authorized to use the vehicle 100. The mobile device 504 of the user 404, which has obtained the access key, may be used as a key to the vehicle 100 to remotely lock/unlock the doors 190 of the vehicle 100 or control start of the engine.

<Second Embodiment>

Figure 7:
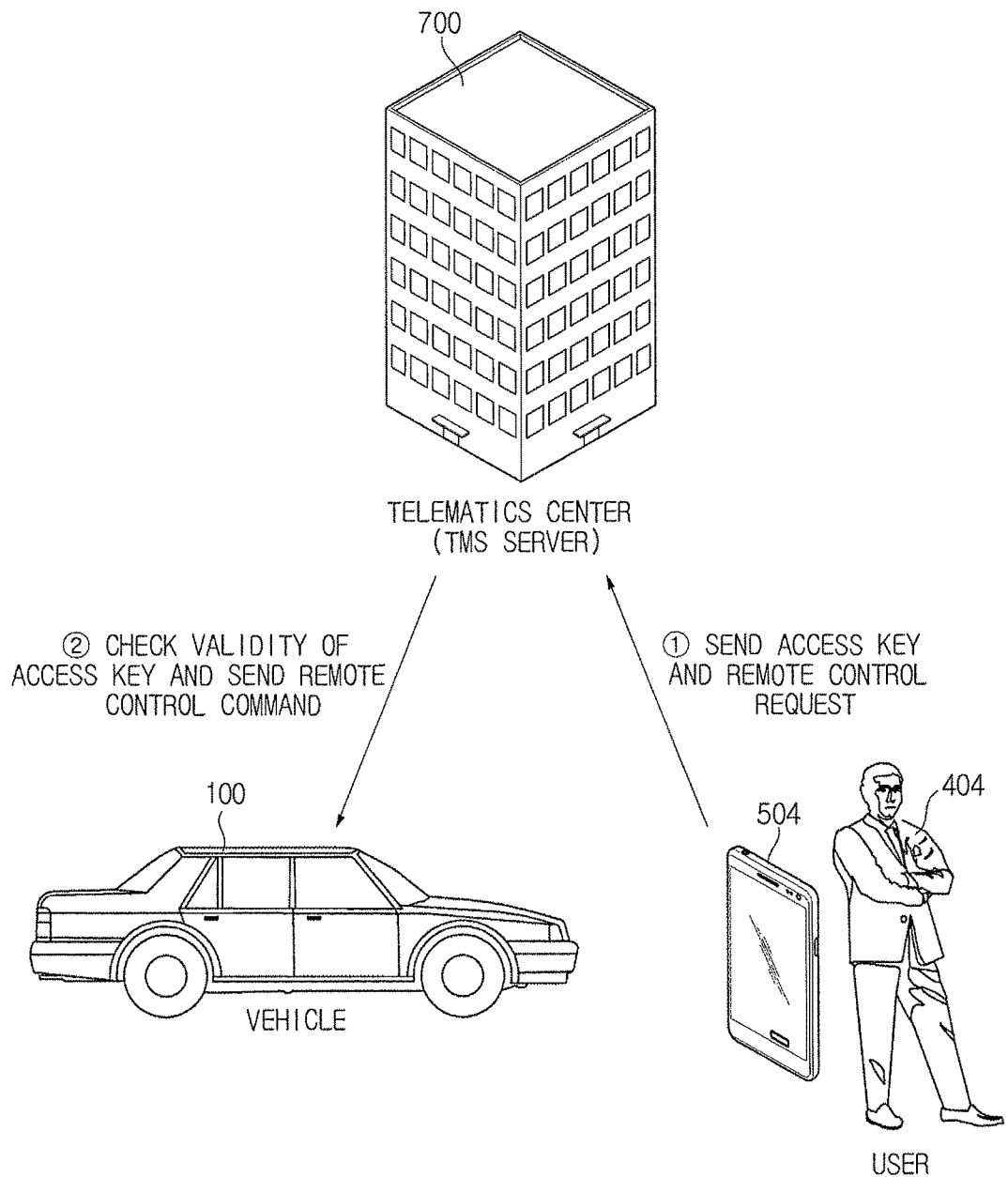
FIG. 7 shows a car management system, according to another embodiment of the present disclosure.
Figure 8:
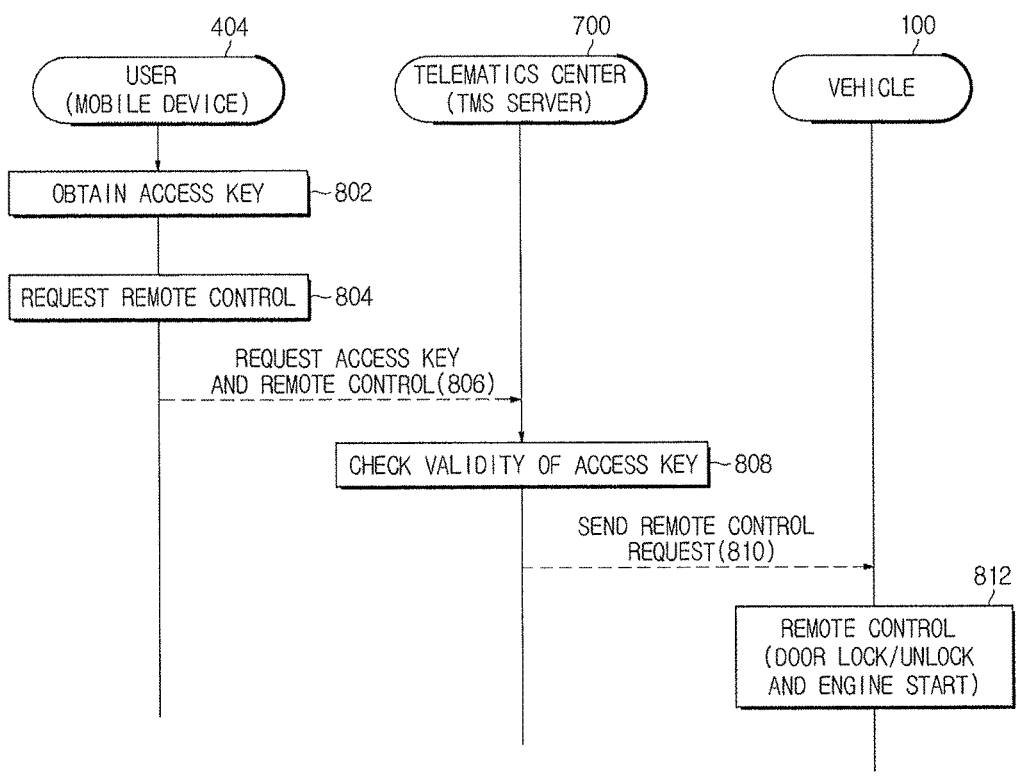
FIG. 8 is a flowchart illustrating a car management method, according to another embodiment of the present disclosure.

FIGS. 7 and 8 show a car management method, according to a second embodiment of the present disclosure. FIG. 7 shows a car management system, according to the second embodiment of the present disclosure, and FIG. 8 is a flowchart illustrating a car management method, according to the second embodiment of the present disclosure. The second embodiment shown in FIGS. 7 and 8 represents a process in which the user 404 uses the access key obtained as authority to use the vehicle 100 and drives the vehicle 100. Especially, in the second embodiment, to control the vehicle 100, a remote control request generated by the mobile device 504 of the user 404 is sent to the vehicle 100 via a telematics center 700.

Referring first to FIG. 7, in a car management system in accordance with the second embodiment of the present disclosure, wireless communication is performed among the user 404, the telematics center 700, and the vehicle 100.

The telematics center 700 communicates with a telematics module of the vehicle 100 over a Wideband Code Division Multiple Access (WCMA) network to enable using various services in the vehicle 100, such as Internet browsing, email, traffic information, calling, route guidance, accident notification, life information, theft detection, voice notes, etc. The telematics module may include the antenna 152, the tuner 354, and the communication signal processor 358, as shown in FIG. 3.

The user 404 may use the mobile device 504 that obtains the access key to perform long range wireless communication with the vehicle 100 via the telematics center 700. Specifically, when the user 404 requests remote control of the vehicle 100 with the mobile device 504, the access key and the remote control request are sent to the server of the telematics center 700 from the mobile device 504. The telematics center 700 checks validity of the access key sent from the mobile device 504 of the user 404, and sends a remote control command to the vehicle 100 to control the vehicle 100 remotely if the access key is valid. In this case, although the vehicle 100 is controlled remotely, the user 404 may not necessarily be located distant from the vehicle 100 but may be located close by the vehicle 100, in which case a remote control request signal generated by the mobile device 504 of the user 404 is sent to the vehicle 100 via the telematics center 700 at a long distance.

A series of processes for the user to lock/unlock the doors and start the engine of the vehicle 100 by means of the mobile device 504 will now be described in connection with FIG. 8.

The user 404 obtains an access key that corresponds to authority to use the vehicle 100 from the service company 500, such as a car rental or car sharing company, in operation 802. A process of obtaining the access key may correspond to the aforementioned series of operations shown in FIGS. 5 and 6.

After obtaining the access key, the user 404 requests remote control to control the vehicle 100 remotely, in operation 804. The remote control request is made through an application in the mobile device 504 of the user 404. Specifically, the user 404 may run the application in the mobile device 504 and manipulate a user interface of the application to generate a desired remote control request.

The remote control request may include requests to lock/unlock the doors 190 of the vehicle 100 and start/stop the engine (not shown) of the vehicle 100. In addition, it may further include a request to open the trunk or turn on/off some lights equipped in the vehicle 100. The remote control request, however, is not limited thereto, but may include many different requests.

The remote control request generated by the mobile device 504 of the user 404 is sent to the server of the telematics center 700 with the access key, in operation 806 (see (1) of FIG. 7).

Upon reception of the access key and remote control request, the server of the telematics center 700 checks validity of the access key in operation 808, and sends the contents of the remote control request to the vehicle 100 if the access key is valid in operation 810 (see (2) of FIG. 7). As for the access key, a high level of security is guaranteed through double security check by the manager 402 and the checkout station 506 of the service company 500, as described above in connection with FIGS. 5 and 6. The validity of the access key includes setting a deadline of the authority issued to the user 404 to use the vehicle 100. For example, the authority of the user 404 may be set to be within 72 hours from 13:00 o'clock on mm (month): dd (day): yyyy (year), and thus the user 404 is prohibited from using the vehicle 100 after that period. For convenience of the user 404, the mobile device 504 of the user 404 may issue a warning a certain hours before the deadline to notify the user 404 that the deadline is near at hand.

Upon reception of the remote control request, an ECU (not shown) of the vehicle 100 performs corresponding control desired by the user 404 in response to the remote control request, in operation 812. For example, the ECU controls unlocking the doors 190 or starting the engine.

If the vehicle 100 is missing or stolen while the authorized user 404 is using the vehicle 100, the user 404 may notify the manager 404 of the missing/robbery, and the manager 404 may then invalidate an access code related to the vehicle 100 to prevent any unauthorized person from using the vehicle 100 without permission.

<Third Embodiment>

Figure 9:
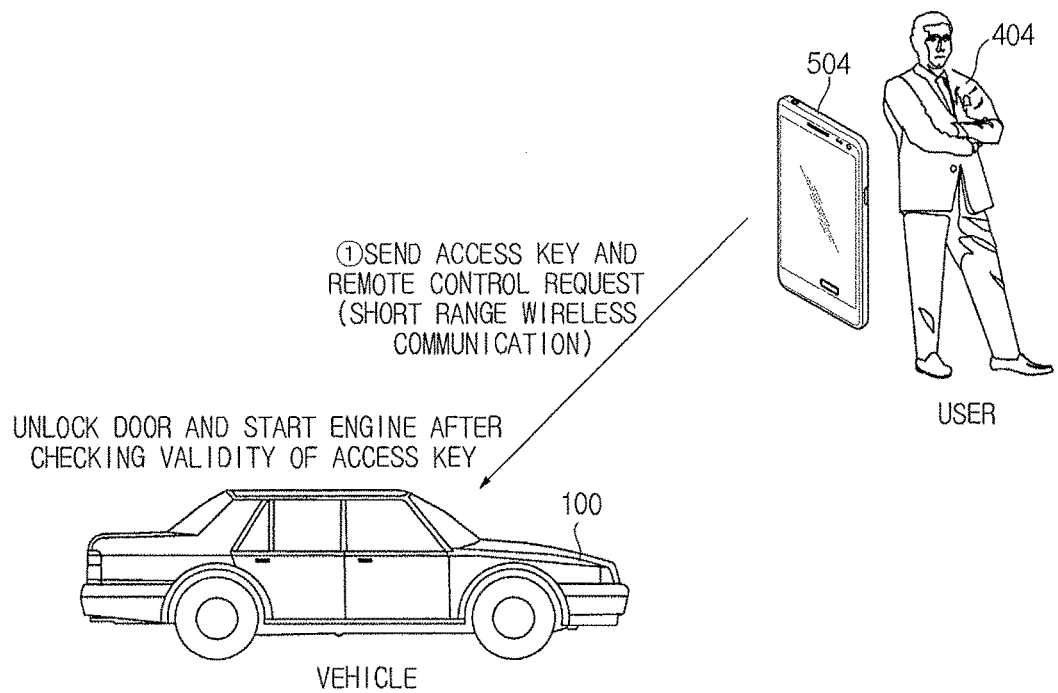
FIG. 9 shows a car management system, according to another embodiment of the present disclosure.
Figure 10:
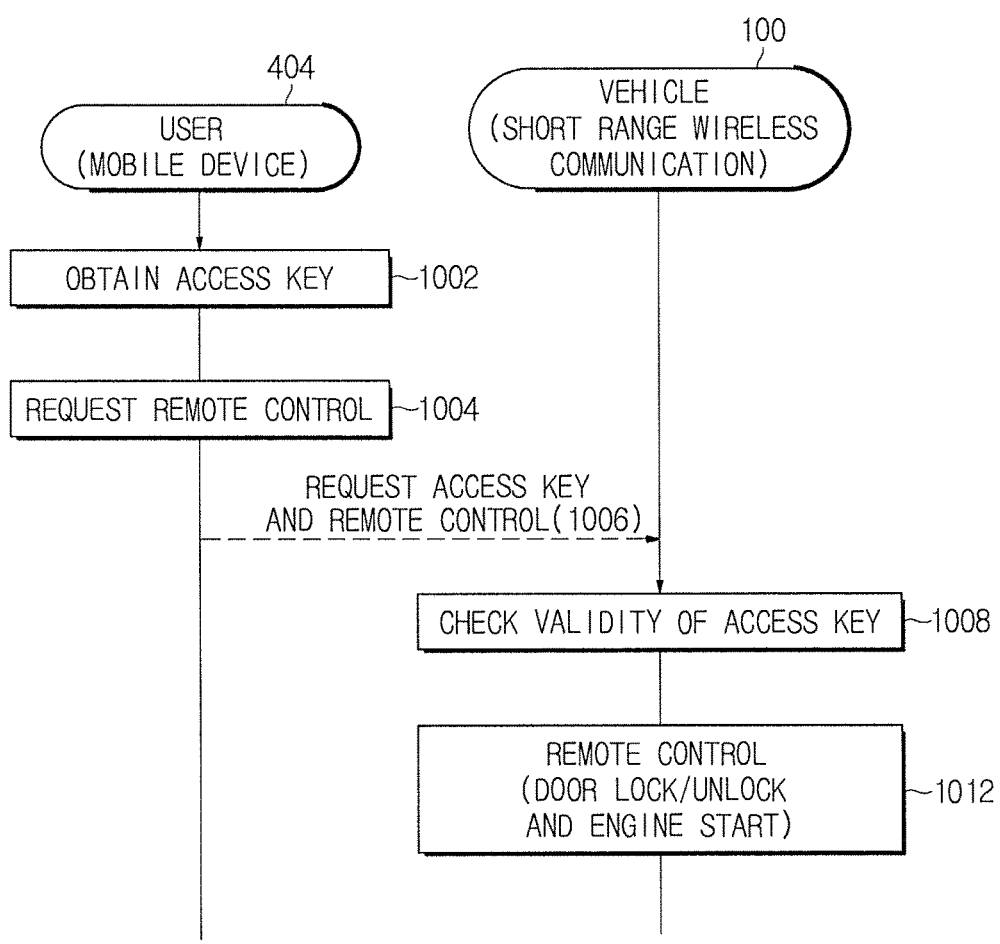
FIG. 10 is a flowchart illustrating a car management method, according to another embodiment of the present disclosure.

FIGS. 9 and 10 show a car management method, according to a third embodiment of the present disclosure. FIG. 9 shows a car management system, according to the third embodiment of the present disclosure, and FIG. 10 is a flowchart illustrating a car management method, according to the third embodiment of the present disclosure. The third embodiment shown in FIGS. 9 and 10 represents a process for the user 404 to use an access key obtained as authority to use the vehicle 100 and start driving the vehicle 100. Especially, in the third embodiment, to control the vehicle 100, a remote control request generated by the mobile device 504 of the user 404 is sent directly to the vehicle 100 without passing the telematics center 700.

Referring first to FIG. 9, in a car management system in accordance with the third embodiment of the present disclosure, short range wireless communication is performed directly between the mobile device 504 of the user 404 and the vehicle 100.

The communication between the mobile device 504 of the user 404 and the vehicle 100 is based on short range wireless communication. For example, the mobile device 504 of the user 404 and the vehicle 100 may communicate in a communication scheme, such as Bluetooth, Wi-Fi, NFC, Zigbee, etc.

Specifically, the user 404 may unlock the doors 190 of the vehicle 100 by approaching the vehicle 100 while carrying the mobile device 504 that has obtained the access key, and generating a remote control request to unlock the doors 190. The user 404 may also control starting the engine of the vehicle 100 by generating a remote control request to start the engine by means of the mobile device 504 that has obtained the access key.

A series of processes for the user to control locking/unlocking the doors and starting the engine of the vehicle 100 by means of the mobile device 504 will now be described in connection with FIG. 10.

The user 404 obtains an access key that corresponds to authority to use the vehicle 100 from the service company 500, such as a car rental or car sharing company, in operation 1002. The process of obtaining the access key may correspond to the aforementioned series of operations shown in FIGS. 5 and 6.

After obtaining the access key, the user 404 requests remote control to control the vehicle 100 remotely, in operation 1004. The remote control request is made through an application in the mobile device 504 of the user 404. Specifically, the user 404 may run the application in the mobile device 504 and manipulate a user interface of the application to generate a desired remote control request.

The remote control request may include requests to lock/unlock the doors 190 of the vehicle 100 and start/stop the engine (not shown) of the vehicle 100. In addition, it may further include a request to open the trunk or turn on/off some lights equipped in the vehicle 100. The remote control request, however, is not limited thereto, but may include many different requests.

The remote control request generated by the mobile device 504 of the user 404 is sent to a short range communication module of the vehicle 100 with the access key on a short range wireless communication channel, in operation 1006 (see (1) of FIG. 9).

Upon reception of the access key and remote control request, the ECU of the vehicle 100 checks validity of the access key, in operation 1008. The validity of the access key includes setting a deadline of the authority issued to the user 404 to use the vehicle 100. For example, the authority of the user 404 may be set to be within 72 hours from 13:00 o'clock on mm (month): dd (day): yyyy (year), and thus the user 404 is prohibited from using the vehicle 100 after that period. For convenience of the user 404, the mobile device 504 of the user 404 may issue a warning a certain hours before the deadline to notify the user 404 that the deadline is near at hand.

Upon reception of the remote control request, an ECU of the vehicle 100 performs corresponding control desired by the user 404 in response to the remote control request, in operation 1012. For example, the ECU may control unlocking the doors 190 or starting the engine.

If the vehicle 100 is missing or stolen while the authorized user 404 is using the vehicle 100, the user 404 may notify the manager 404 of the missing/robbery, and the manager 404 may then invalidate an access code related to the vehicle 100 to prevent any unauthorized person from using the vehicle 100 without permission.

<Fourth Embodiment>

Figure 11:
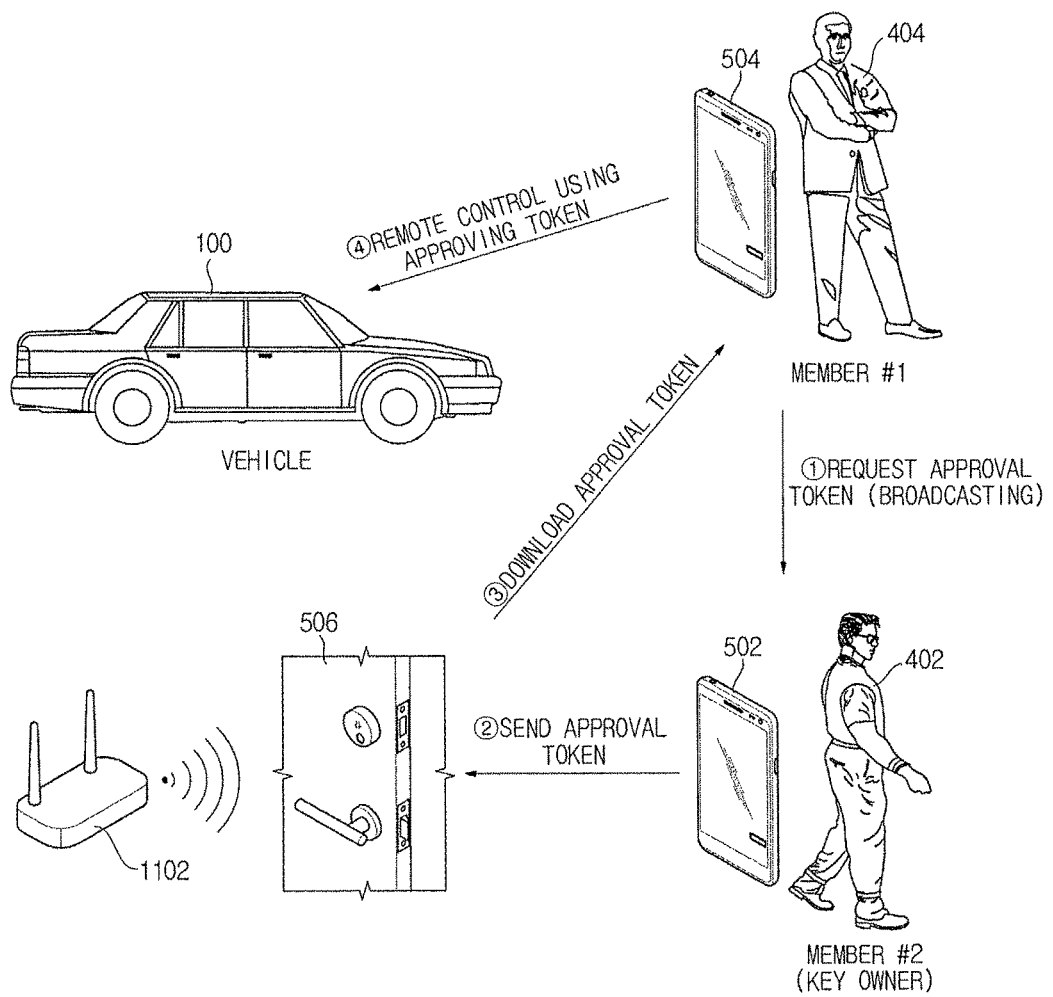
FIG. 11 shows a car management system, according to another embodiment of the present disclosure.

FIGS. 11 and 12 show a car management method, according to a fourth embodiment of the present disclosure. FIG. 11 shows a car management system, according to the fourth embodiment of the present disclosure, and FIG. 12 is a flowchart illustrating a car management method, according to the fourth embodiment of the present disclosure. The fourth embodiment shown in FIGS. 11 and 12 represents a process in which, in case that the vehicle 100 is shared among family members of a family or among members of a small, closed group, member #2 402 who owns a key to the vehicle 100 authorizes other member 404 to use the vehicle 100.

Referring first to FIG. 11, in the car management system in accordance with the fourth embodiment of the present disclosure, if member #1 404 who wants to use the vehicle 100 requests an approval token corresponding to authority to use the vehicle 100 from other members, the member #2 402 who owns the key among the members sends the approval token to the checkout station 506 and the member #1 404 who requests the approval token downloads the approval token from the checkout station 506 to his/her mobile device 504 to control the vehicle 100 remotely.

Although the checkout station 506 in the first to third embodiments (see FIGS. 5, 7 and 9) has the form of a dedicated unmanned device installed in a place where the vehicle 100 is standing by, the checkout station 506 in the fourth embodiment may use a wireless communication device installed in the space shared by the members of the family or of the small, closed group. For example, an IoT device may be used as the checkout station 506. In the embodiment of FIG. 11, assume that the checkout station 506 is a smart door lock, which is a kind of the IoT device. The smart door lock used as the checkout station 506 may contain a memory, access the Internet via an access point 1102, and may be capable of performing short range wireless communication using Wi-Fi. The checkout station 506 is not limited to the smart door lock, but may be any device that is equipped with a memory and capable of performing short range wireless communication. The memory may have a form that may be physically installed in the checkout station 506, or may have a form of e.g., a virtual drive, web hard, cloud, etc., that is implemented online.

In case of family members living together in a house, if the member #2 402 who owns the key to the vehicle 100 generates and uploads an approval token to the smart door lock that serves as the checkout station 506 through the mobile device 502 in response to a request of the member #1 404 for the approval token, the member #1 404 who has requested the approval token may use the mobile device 504 to download the approval token from the smart door lock. The mobile device 504 of the member #1 404, which downloads the approval token, operates like a key to the vehicle 100. Specifically, the member #1 404 may unlock the doors 190 of the vehicle 100 by approaching the vehicle 100 while carrying the mobile device 504 that has obtained the approval token, and generating a remote control request to unlock the doors 190. The member #1 404 may also control starting the engine of the vehicle 100 by generating a remote control request to start the engine by means of the mobile device 504 that has obtained the approval token.

Making it possible to remotely control the vehicle 100 with the approval token without generating a separate access key is to enable the family members of a family or members of a closed group to more conveniently share the vehicle 100 with reduced security processing steps because the members of the family and the closed group, literally, are not open. However, to increase the security level even among the members of the non-open group like the members of a family or a closed group, an additional security processing step or a step of generating an access key using a plurality of approval tokens may be added.

A series of operations for a member of a family or of a small group to request the use of the vehicle 100 and obtain the authority to use the vehicle 100 will now be described in connection with FIG. 12.

The member #1 404 from a family or from a small, closed group, who wants to use the vehicle 100, requests an approval token from all the other members including the member #2 402, in operation 1202. The member #1 404 may run an application installed in his/her mobile device 504 and request the approval token by inputting information required for the request for the approval token.

The request for the approval token generated by the mobile device 504 of the member #1 404 is sent to all the other members, including the member #2 402, in operation 1204 (see (1) of FIG. 11). The request for the approval token may be sent from the member #1 404 to the member #2 in a broadcasting scheme. In other words, the request for an approval token is made not by designating a particular member to request the approval token but by sending the request to all the predetermined members.

A member among the other members, e.g., the member #2 402 who owns the key or who is authorized to generate the approval token generates the approval token through his/her mobile device 502, in operation 1206. In other words, the member #2 402 may run an application installed in his/her mobile device 502 to perform a series of tasks to generate the approval token.

The approval token generated by the mobile device 502 of the member #2 402 is sent to the checkout station 506 through short range wireless communication, in operation 1208 (see (2) of FIG. 11). The received approval token is stored in a memory of the checkout station 506.

Once the approval token is stored in the checkout station 506, the member #1 404 requesting the approval token accesses the checkout station 506 through his/her mobile device 504 and downloads the stored approval token, in operation 1210 (see (3) of FIG. 11).

The member #1 404 who has obtained the approval token generates a remote control command to remotely control the vehicle 100 in his/her mobile device 504, in operation 1212 (see (4) of FIG. 11). The remote control request is generated by an application in the mobile device 504 of the member #1 404. Specifically, the member #1 404 may run the application in the mobile device 504 and manipulate a user interface of the application to generate a desired remote control request.

The remote control request may include requests to lock/unlock the doors 190 of the vehicle 100 and start/stop the engine (not shown) of the vehicle 100. In addition, it may further include a request to open the trunk or turn on/off some lights equipped in the vehicle 100. The remote control request, however, is not limited thereto, but may include many different requests.

Having the member #1 404 receive the approval token not directly from the member #2 402 but through the checkout station 506 is to allow the member #1 404 to download the approval token from a designated place e.g., where the checkout station 506 is installed, anywhere anytime. This is because, if the member #1 404 wants to receive the approval token directly from the member #2 402, the members #1 and #2 need to all be in the same place at same time. However, if the member #2 402 stores the approval token in the checkout station 506, the member #1 404 may freely download the approval token by accessing the checkout station 506 anywhere anytime.

According to embodiments of the present disclosure, in a system where a single vehicle is shared by multiple users, the users may be more conveniently authorized to use the vehicle. Furthermore, in the system where a single vehicle is shared by multiple users, the security level may be raised in authorizing the users to use the vehicle.

Several embodiments have been described, but a person of ordinary skill in the art will understand and appreciate that various modifications can be made without departing the scope of the present disclosure. Thus, it will be apparent to those ordinary skilled in the art that the disclosure is not limited to the embodiments described, but can encompass not only the appended claims but the equivalents.

What is claimed is:

1. A car management system comprising:
   a second terminal generating first and second tokens in response to a request from a first terminal to use a vehicle, and sending the first token to the first terminal; and
   a third terminal authorizing the first terminal to use the vehicle by generating an access key that provides authority to use the vehicle using the first token and the second token in response to a request from the first terminal for the access key, and providing the generated access key to the first terminal,
   wherein the second and third terminals are disposed outside of the vehicle.

2. The car management system of claim 1, wherein the third terminal generates the access key when a result of combining the first token and the second token under a predetermined rule meets a predetermined access key generation condition.

3. The car management system of claim 1, wherein the first and second terminals, respectively, are mobile devices capable of wireless communication.

4. The car management system of claim 3, wherein the first terminal is a mobile device of a user that uses the vehicle, and the second terminal is a mobile device of a manager who has a right to manage the vehicle.

5. The car management system of claim 1, wherein the third terminal is an unmanned terminal installed in a location where the vehicle for which authority is to be issued is standing by.

6. The car management system of claim 1, wherein the first terminal generates and sends a remote control command to the vehicle through a remote server so as to control the vehicle.

7. The car management system of claim 6, wherein the server is a server of a telematics center.

8. The car management system of claim 6, wherein the server checks a validity of the access key provided to the first terminal before sending the remote control command to the vehicle.

9. The car management system of claim 1, wherein the first terminal generates and sends a remote control command to the vehicle through short range wireless communication so as to control the vehicle.

10. The car management system of claim 1, wherein the request from the first terminal to use the vehicle includes user information of a user that will use the vehicle, and validity of the user information is determined when the first and second tokens are generated by the second terminal.

11. The car management system of claim 1, wherein:
- the second terminal generates an approval token in response to the request from the first terminal to use the vehicle and sends the approval token to the third terminal, and
- the third terminal receives the approval token from the second terminal and stores the approval token, enabling the first terminal to be authorized to use the vehicle by providing the approval token to the first terminal in response to a request from the first terminal to download the approval token.

* * * * *